United States Patent
Valette et al.

(10) Patent No.: US 10,303,403 B2
(45) Date of Patent: May 28, 2019

(54) INDUSTRIAL PRINTER AND METHOD THEREIN FOR PRINTING PRINT INFORMATION ON AT LEAST ONE INFORMATION CARRIER

(71) Applicant: Dover Europe Sàrl, Vernier (CH)

(72) Inventors: Stephane Valette, Etoile-sur-Rhône (FR); Elisabeth Martin, Chatuzange-le-Goubet (FR)

(73) Assignee: Dover Europe Sàrl (CH)

( * ) Notice: Subject to any disclaimer, the term of this patent is extended or adjusted under 35 U.S.C. 154(b) by 0 days.

(21) Appl. No.: 15/740,908

(22) PCT Filed: Jun. 29, 2016

(86) PCT No.: PCT/EP2016/065144
§ 371 (c)(1),
(2) Date: Dec. 29, 2017

(87) PCT Pub. No.: WO2017/001478
PCT Pub. Date: Jan. 5, 2017

(65) Prior Publication Data
US 2018/0196624 A1 Jul. 12, 2018

Related U.S. Application Data

(60) Provisional application No. 62/187,271, filed on Jul. 1, 2015.

(51) Int. Cl.
*G06F 3/12* (2006.01)
*B65B 61/02* (2006.01)
*B65B 61/26* (2006.01)

(52) U.S. Cl.
CPC .......... *G06F 3/1206* (2013.01); *B65B 61/025* (2013.01); *B65B 61/26* (2013.01); *G06F 3/1243* (2013.01); *G06F 3/1285* (2013.01)

(58) Field of Classification Search
CPC .... G06F 3/1206; G06F 3/1243; G06F 3/1285; G06Q 10/08; B65B 61/025; B65B 61/26
See application file for complete search history.

(56) References Cited

U.S. PATENT DOCUMENTS

2002/0174148 A1* 11/2002 Seidman ............... G06F 17/211
715/249
2004/0227973 A1* 11/2004 Taylor ................... G06F 3/1204
358/1.15

(Continued)

OTHER PUBLICATIONS

International Search Report for Application No. PCT/EP2016/065144, dated Sep. 5, 2016.

*Primary Examiner* — Iriana Cruz
(74) *Attorney, Agent, or Firm* — Lerner, David, Littenberg, Krumholz & Mentlik, LLP (57) ABSTRACT

A method, a printer and a computer program for printing print information on at least one information carrier (122) comprising: receiving (201) print data comprising the print information in a first print information format; receiving (202) print instructions relating the print data to at least one property associated with the at least one information carrier (122); adapting (203) the print information in the print data into a second print information format according to one or more predetermined rules (162) in a database (161) corresponding to the related at least one property associated with the at least one information carrier (122); and printing (204) the adapted print information in the second print information format on the at least one information carrier (122).

10 Claims, 4 Drawing Sheets

| Property | Italy | USA | Japan | Arabic | ... |
|---|---|---|---|---|---|
| 1) | Da consumarsi preferibimente entro | Best before | 賞味期限は... | من الأفضل استخدامه قبل | ... |
| 2) | Data di scadenza | Expiration date | 有効期限 | تاريخ انتهاء الصلاحية | ... |
| 3) | dd/mm/yy | mm/yy | yyyy/mm/dd | dd/mm/yy | ... |
| 4) | 0000123456 | 123456 | ----123456 | 654321 | ... |
| ... | ... | ... | ... | ... | ... |

162

(56) References Cited

U.S. PATENT DOCUMENTS

| | | |
|---|---|---|
| 2006/0075329 A1 | 4/2006 | Sullivan et al. |
| 2014/0139860 A1* | 5/2014 | Nishida ................. G06F 3/1297 358/1.13 |
| 2015/0029552 A1* | 1/2015 | Nishizawa ............ G06F 3/1253 358/1.15 |

* cited by examiner

| Property | Italy | USA | Japan | Arabic | |
|---|---|---|---|---|---|
| 1) | Da consumarsi preferibimente entro | Best before | 賞味期限は ... | من الأفضل استخدامه قبل | ... |
| 2) | Data di scadenza | Expiration date | 有効期限 | تاريخ انتهاء الصلاحية | ... |
| 3) | dd/mm/yy | mm/yy | yyyy/mm/dd | dd/mm/yy | ... |
| 4) | 00001234546 | 123456 | ----123456 | 654321 | ... |
| ... | | | | | ... |

INDUSTRIAL PRINTER AND METHOD THEREIN FOR PRINTING PRINT INFORMATION ON AT LEAST ONE INFORMATION CARRIER

CROSS-REFERENCE TO RELATED APPLICATIONS

The present application is a national phase entry under 35 U.S.C. § 371 of International Application No. PCT/EP2016/065144, filed Jun. 29, 2016, which claims priority from U.S. Provisional Application No. 62/187,271, filed Jul. 1, 2015, all of which are incorporated herein by reference.

TECHNICAL FIELD

Embodiments herein relate to industrial printers. In particular, embodiments herein relate to an industrial printer and method therein for printing print information on at least one information carrier. Embodiments herein also relates to computer program products for printing print information on at least one information carrier.

BACKGROUND

In an industrial printing system, an industrial printer is typically configured to print different types of information on various types of information carriers, such as, items, products or articles. One example of an operation of such an industrial printer is the printing of print information on various types of packages or consumer goods. Commonly, such packages or consumer goods require a great deal of product identifications and content specifications, for example, traceability data, serial numbers, time and dates of packaging, expiry dates, etc. Therefore, the print information to be printed on the package or consumer goods may vary from one item to the next in a batch of items, from one batch of items to another, from one site of manufacture to another, from one time of manufacture to another, from one type of print technology to another, etc.

The print information may comprise both print information data and print information instructions. The print information data may comprise, for example, references to printer ready bitmap images, such as, e.g. barcodes, or the print ready information to be printed as is; while the print information instructions on the other hand may comprise, for example, code algorithms for the printer to determine print information data on-the-fly, i.e. as it is being printed, such as, e.g. incremental enumerations, or coded instructions indicating how the print information data is to be printed on the information carrier. This print information also conforms into a specific print information format.

The print information in the print information format may be provided to the industrial printer as part of the print data, i.e. print job data or print batch data controlling the industrial printer to start printing. The print information and print data may conventionally be manually generated via a print design tool or software running on a computer configured to communicate with the industrial printer.

However, with ever increasing global distribution networks, there is an issue with being capable of providing correct print information on items or packages that have to comply with different rules or regulations which depends on which country, market, calendar, language, date format, number format, font size, etc., that each individual item or package is designated for. Today, the responsibility lies with the operator of the industrial printer to ensure that the correct print information is printed on each individual item or package irrespective of designation of the individual item or package.

SUMMARY

It is an object of embodiments herein to increase the reliability of the print information being printed on an information carrier.

According to a first aspect of embodiments herein, the object is achieved by a method performed by an industrial printer for printing print information on at least one information carrier. The industrial printer receives print data comprising the print information in a first print information format. Also, the industrial printer receives print instructions relating the print data to at least one property associated with the at least one information carrier. Then, the industrial printer adapts the print information in the print data into a second print information format according to one or more predetermined rules in a database corresponding to the related at least one property associated with the at least one information carrier. Further, the industrial printer prints the adapted print information in the second print information format on the at least one information carrier.

According to a second aspect of embodiments herein, the object is achieved by an industrial printer for printing print information on at least one information carrier. The industrial printer is configured to receive print data comprising the print information in a first print information format, receive print instructions relating the print data to at least one property associated with the at least one information carrier, adapt the print information in the print data into a second print information format according to one or more predetermined rules in a database corresponding to the related at least one property associated with the at least one information carrier, and print the adapted print information in the second print information format on the at least one information carrier.

According to a fifth aspect of embodiments herein, the object is achieved by a computer program for printing print information on at least one information carrier comprising instructions which, when executed on at least one processor of a printer, cause the printer to: receive print data comprising the print information in a first print information format, receive print instructions relating the print data to at least one property associated with the at least one information carrier, adapt the print information in the print data into a second print information format according to one or more predetermined rules in a database corresponding to the related at least one property associated with the at least one information carrier, and print the adapted print information in the second print information format on the at least one information carrier.

By having an industrial printer as described above, the level of input and knowledge of different regulations required by the operator of the industrial printer when determining the print information for different information carriers having different designations may be significantly reduced. This is because the operator of the industrial printer only need to input at least one property associated with a specific information carrier in order for the industrial printer to be able to adapt the print information in accordance with the specific designation of the specific information carrier.

This will reduce the risk of errors in the print information and thus increase the reliability of the print information being printed on an information carrier. For example, an operator may enter the desired print information according to local regulations and in a local language that are well-known to the operator. Then, by entering an additional property associated with the specific information carriers to be printed on the adaptation of the print information may be handled, such as, e.g. date and date format adaptations, text language adaptations, or number series adaptations, etc., to correctly reflect other local/regional regulations and languages that are associated with the specific country or market designation of the specific information carriers.

BRIEF DESCRIPTION OF THE DRAWINGS

Exemplary embodiments will now be described in more detail in relation to the enclosed drawings.

DETAILED DESCRIPTION

The figures are schematic and simplified for clarity, and they merely show details for the understanding of the embodiments presented herein, while other details have been left out.

Figure 1:
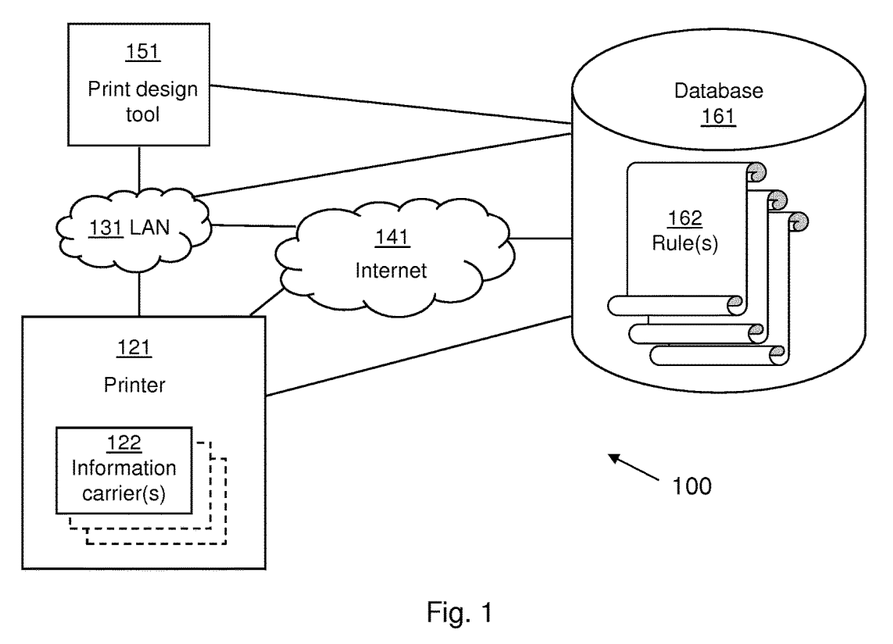
FIG. 1 is a schematic block diagram illustrating embodiments of an industrial printer in an industrial printer system.

FIG. 1 shows an example of an industrial printer system 100 in which embodiments herein may be implemented.

In the industrial printer system 100 in FIG. 1, an industrial printer 121 is configured for printing print information on at least one information carrier 122.

Examples of information carriers may comprise items, products, articles, packages, goods, etc., on which information is to be printed. The industrial printer 121 may be connected to a Local Area Network, LAN, 131. Alternatively, the industrial printer 121 may also be connected to a Wide Area Network, WAN, such as, e.g. the internet 141. It should also be noted that the industrial printer 121 may be connected to both the LAN 131 and the WAN/Internet 141.

Furthermore, the industrial printer 121 may be connected to a print design tool 151 configured to provide the industrial printer 121 with print data and/or print instructions. The print design tool 151 may be a separate print design apparatus, for example, a standalone computer running print design software/computer program. Alternatively, the print design tool 151 may be implemented in the industrial printer 121, in which case the industrial printer 121 may comprise a user interface (not shown) through which a user may enter print data and/or print instructions. The printer 121 may also be connected to the print design tool or apparatus 151 directly, via the LAN 131 and/or the WAN/Internet 141.

The industrial printer 121 may also be configured to communicate with a database 161. This may be performed via a direct connection, via the LAN 131 and/or via the WAN/Internet 141. The print design tool 151 may also configured to communicate with the database 161, e.g. via a direct connection, via the LAN 131 and/or via the WAN/Internet 141. The database 161 may comprise predetermined rules 162 for the format of the print information. Each of the predetermined rules 162 is associated with at least one property of an information carrier. This means that one or more predetermined rules 162 determine a specific print information format for the print information based on at least one property of the information carrier 122 on which the print information is to be printed. The at least one property of the information carrier 122 may, for example, be the country and/or market for which the information carrier 122 is designated, i.e. the place where the information carrier 122 is intended to be sold or traded.

Furthermore, although embodiments below are described with reference to the scenario of FIG. 1, this scenario should not be construed as limiting to the embodiments herein, but merely as an example made for illustrative purposes.

Figure 2:
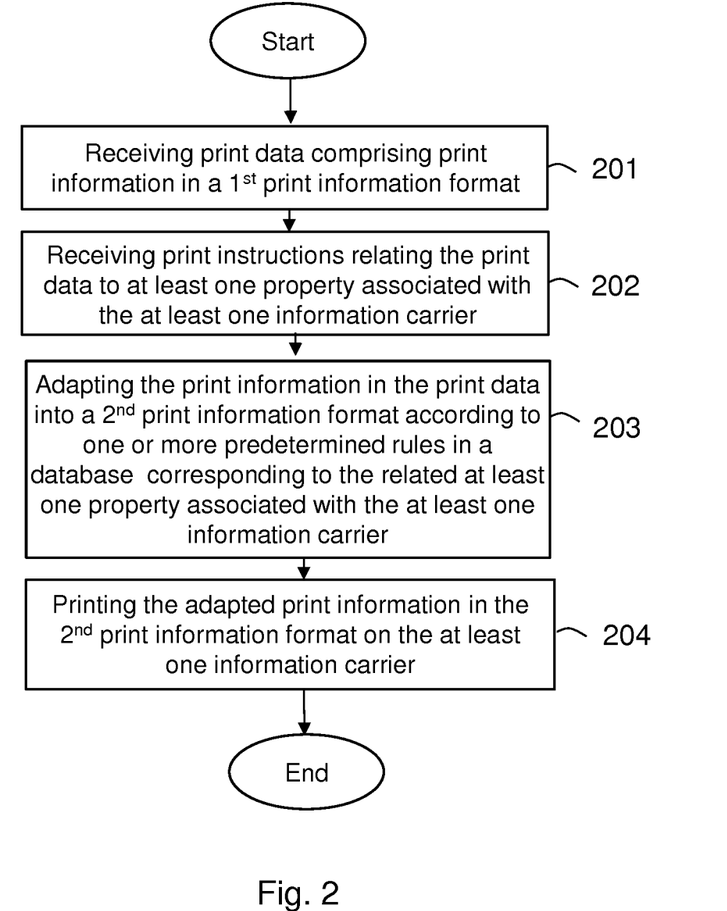
FIG. 2 is a flowchart depicting embodiments of a method performed in an industrial printer.

Example of embodiments of a method performed by an industrial printer 121 for printing print information on at least one information carrier 122 will now be described with reference to the flowchart depicted in FIG. 2. FIG. 2 illustrates an example of actions or operations which may be taken by the industrial printer 121.

Action 201

First, the industrial printer 121 receives print data comprising the print information in a first print information format. This means, for example, that the industrial printer 121 may receive print data from the print design tool 151 (or a data storage), which print data comprise print information that the operator of the print design tool 151 and/or the industrial printer 121 has entered according to local regulations for the information carrier 122 and in a local language that are well-known to the operator.

Figure 3:
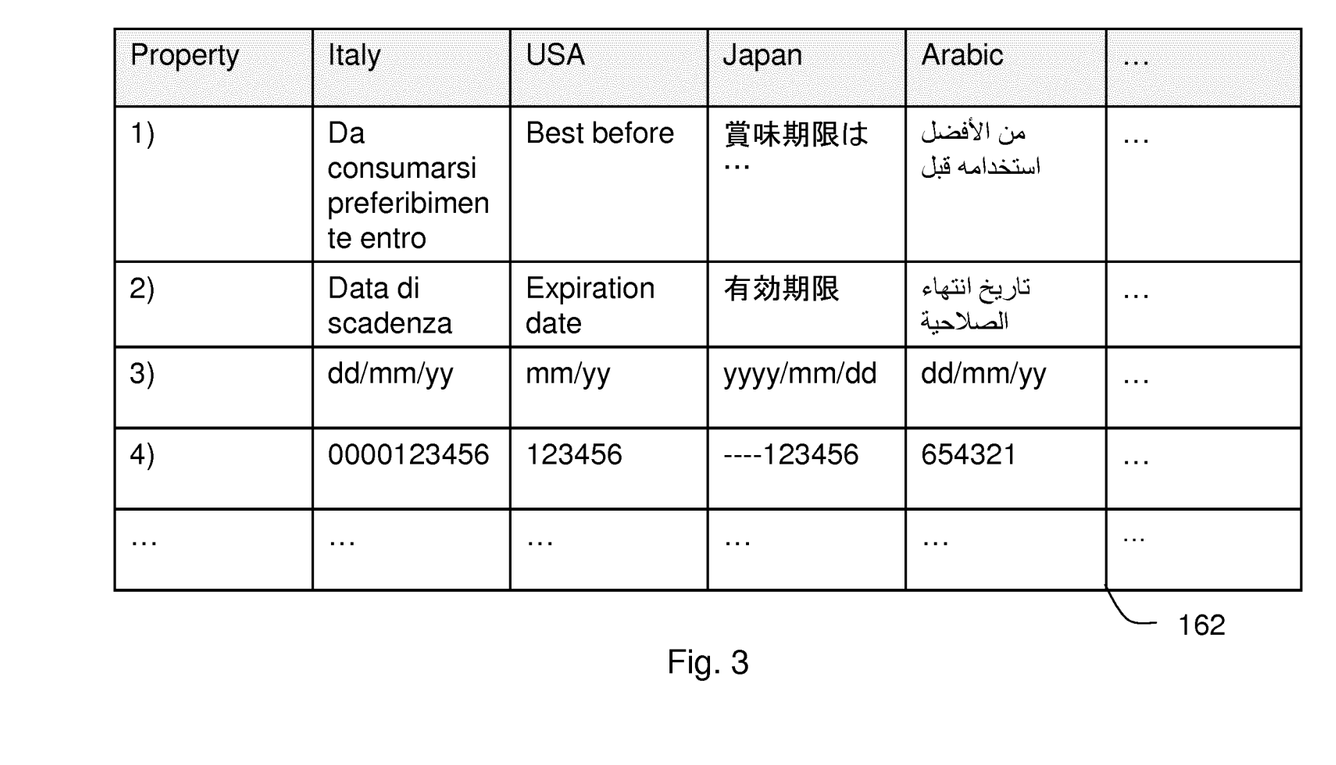
FIG. 3 illustrates examples of predetermined rules in a database.

For example, assuming a printing site located and based in Italy, the print information in the print data may be received by the industrial printer 121 in a first printing data format which may be predetermined in the database 161, e.g. according to items 1-4 in the examples of predetermined rules in FIG. 3 and indicated under the property "Italy", i.e. a property of the at least one information carrier 122.

Action 202

In addition to the reception in Action 201, the industrial printer 121 also receives print instructions relating the print data to at least one property associated with the at least one information carrier 122. The industrial printer 121 may receive the print instructions from the operator via e.g. the print design tool 151 and/or a user interface (not shown) of the industrial printer 121. The print instructions are configured to relate or associate the print data received in Action 201 with at least one property associated with the at least one information carrier 122.

In some embodiments, the at least one property associated with the at least one information carrier 122 may, for example, be the country and/or market for which the information carrier 122 is designated. For example, the country "USA" or market "Arabic" as shown among the properties in the example of rules or regulations in FIG. 3 that may be predetermined in the database 161.

In some embodiments, as shown in FIG. 3, the one or more predetermined rules in the database 161 may correspond to regulations for the print information to be in a specific print information format. This is shown, for example, by item 3 in the example of rules or regulations in FIG. 3, where different date formats are associated with the different properties associated with the at least one information carrier 122. In this case, according to some embodiments, the regulations for the print information is related to one or more specific date formats, specific font sizes and/or type formats, specific number formats, specific dimension formats, specific barcode rules, or specific white space rules.

Action 203

The industrial printer 121 then adapts the print information in the print data into a second print information format according to one or more predetermined rules 162 in a database 161 corresponding to the related at least one property associated with the at least one information carrier 122. This means that the industrial printer 121 may determine a second print information format for the print information, received in Action 201, according to the predetermined rules 162 in the database 161 based upon the at least one property associated with the at least one information carrier 122, received in the print instructions in Action 202, related to the print data comprising the print information.

In some embodiments, the industrial printer 121 may adapt the print information in the print data into different visual format and/or adapting the content of the print information. For example, as shown in FIG. 3, in case the print information of the print data was received in a first print information format according to items 1-4 indicated under the property "Italy" and the received at least one property associated with the information carrier 122 was "USA", the industrial printer 121 would:

Adapt the printing data content corresponding to item 1 from "Da consumarsi preferibimente entro" to "Best before";

Adapt the printing data content corresponding to item 2 from "Data di scadenza" to "Expiration date";

Adapt the printing data format for dates corresponding to item 3 from "dd/mm/yy" to "mm/yy"; and Adapt the printing data format for serial numbers corresponding to item 4 from "0000123456" to "123456".

Figure 4:
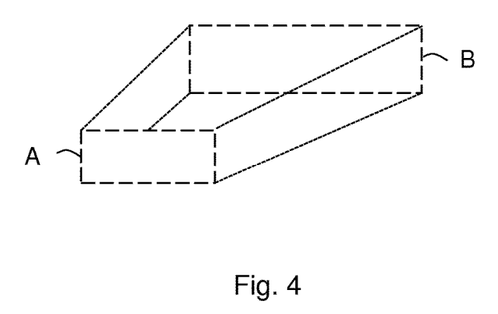
FIG. 4 illustrates example of print information formats.

In some embodiments, the industrial printer 121 may adapt a first print area of the first print information format into a second print area to fit the second print information format. For example, according to FIG. 4, the industrial printer 121 may expand the first print area A in FIG. 4 into the second print area B in FIG. 4, i.e. a larger print area, in order to accommodate the print information in the second print information format.

Action 204

After the adaptation in Action 203, the industrial printer 121 prints the adapted print information in the second print information format on the at least one information carrier 122. Since the received print information has been adapted according to the predetermined rules 162 in the database 161, as indicated by the at least one property associated with the information carrier 122, the actual print information printed on the information carrier 122, i.e. the adapted print information, will be ensured to follow the predetermined rules 162 in the database 161. Hence, the risk of errors in the adapted print information is reduced and thus the reliability that the print information being printed on an information carrier 122 is actually correct is increased.

In some embodiments, in case the print area of the printing data was adapted, the industrial printer 121 may print the adapted print information in the second print data format on the at least one information carrier 122 according to the second print area. For example, in case the industrial printer 121 adapted the print area A in FIG. 4 into the second print area B in FIG. 4 in order to accommodate the print information in the second print information format as described in Action 203, the industrial printer 121 may print the adapted print information in the second and larger print area B on the information carrier 122.

It should be noted that both design and printing of the job may be carried out with an external software module such as CoLOS or a terminal with comprising design and job printing software.

Figure 5:
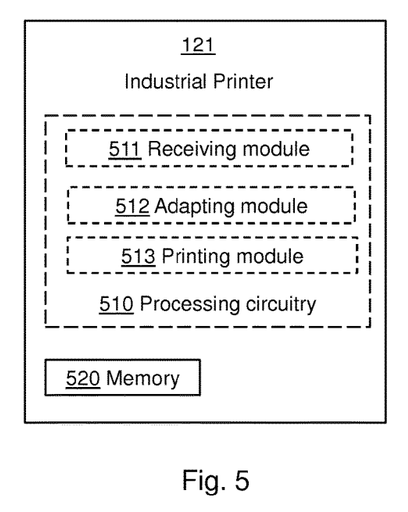
FIG. 5 is a schematic block diagram depicting embodiments of an industrial printer.

To perform the method actions in the industrial printer 121 for printing print information on at least one information carrier 122, the industrial printer 121 may comprise the following arrangement depicted in FIG. 5. FIG. 5 shows a schematic block diagram of embodiments of the industrial printer 121.

In some embodiments, the industrial printer 121 may comprise a receiving module 511, an adapting module 512, and a printing module 513. In some embodiments, the industrial printer 121 may comprise a processing circuitry 510, which may also be referred to as processing module, processing unit or processor. The processing circuitry 510 may comprise one or more of the receiving module 511, the adapting module 512, and the printing module 513, and/or itself perform the function thereof.

The industrial printer 121 is configured to, e.g. by means of the receiving module 511, receive print data comprising the print information in a first print information format. Also, the industrial printer 121 is configured to, e.g. by means of the receiving module 511, receive print instructions relating the print data to at least one property associated with the at least one information carrier 122. Also, the industrial printer 121 is configured to, e.g. by means of the adapting module 512, adapt the print information in the print data into a second print information format according to one or more predetermined rules 162 in a database 161 corresponding to the related at least one property associated with the at least one information carrier 122. Furthermore, the industrial printer 121 is configured to, e.g. by means of the printing module 513, print the adapted print information in the second print information format on the at least one information carrier 122.

In some embodiments, the industrial printer 121 may be configured to, e.g. by means of the adapting module 512, adapt the print information in the print data into different visual format and/or adapting the content of the print information. Also, the industrial printer 121 may be configured to, e.g. by means of the adapting module 512, adapt a first print area of the first print information format into a second print area to fit the second print information format. In this case, the industrial printer 121 may also be configured to, e.g. by means of the printing module 512, print the adapted print information in the second print data format on the at least one information carrier 122 according to the second print area.

According to some embodiments, the at least one property associated with the at least one information carrier 122 is the country and/or market for which the information carrier 122 is designated for. Also, in some embodiments, the one or more predetermined rules 162 in the database 161 correspond to regulations for the print information to be in a specific print information format. In some embodiments, the regulations for the print information is related to one or more specific date formats, specific font sizes and/or type formats, specific number formats, dimension formats, specific barcode rules, or specific white space rules.

The embodiments for printing print information on at least one information carrier 122 may be implemented through one or more processors, such as, e.g. the processing circuitry 510 in the industrial printer 121 depicted in FIG. 5, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 510 in the industrial printer 121. The computer program code may e.g. be provided as pure program code in the industrial printer 121 or on a server and downloaded to the industrial printer 121. The carrier may be one of an electronic signal, optical signal, radio signal, or computer readable storage medium, such as, e.g. electronic memories like a RAM, a ROM, a Flash memory, a magnetic tape, a CD-ROM, a DVD, a Blueray disc, etc.

The industrial printer 121 may further comprise a memory 520, which may be referred to or comprise one or more memory modules or units. The memory 520 may be arranged to be used to store executable instructions and data to perform the methods described herein when being executed in the industrial printer 121. Those skilled in the art will also appreciate that the processing circuitry 510 and the memory 520 described above may refer to a combination of analog and digital circuits, and/or one or more processors configured with software and/or firmware, e.g. stored in the memory 520, that when executed by the one or more processors such as the processing circuitry 510 perform the method as described above. The processing circuitry 510 and the memory 520 may also be referred to as processing means. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

From the above it may be seen that some embodiments may comprise a computer program product, comprising instructions which, when executed on at least one processor, e.g. the processing circuitry 510 or modules 511-513, cause the at least one processor to carry out the method for printing print information on at least one information carrier 122. Also, some embodiments may, as described above, further comprise a carrier containing the computer program, wherein the carrier is one of an electronic signal, optical signal, radio signal, or computer readable storage medium.

The terminology used in the detailed description of the particular embodiments illustrated in the accompanying drawings is not intended to be limiting of the described industrial printer 121 or method therein or described computer program product, which instead should be construed in view of the enclosed exemplary embodiments.

As used herein, the term "and/or" comprises any and all combinations of one or more of the associated listed items.

Further, as used herein, the common abbreviation "e.g.", which derives from the Latin phrase "exempli gratia," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by an industrial printer for printing print information on at least one information carrier, the method comprising:
   receiving print data comprising the print information in a first print information format corresponding to a first country or market;
   receiving print instructions relating the print data to at least one property associated with the at least one information carrier, the information carrier comprising the item to be printed on;
   adapting the print information in the print data into a second print information format corresponding to a second country or market according to one or more predetermined rules in a database corresponding to the related at least one property associated with the at least one information carrier, the at least one property being the second country or market for which the information carrier is designated, the one or more predetermined rules providing different information formatting for the first country or market and for the second country or market; and
   adapting a first print area of the first print information format into a second print area to fit the second print information format, and printing the adapted print information in the second print data format on the at least one information carrier according to the second print area.

2. The method according to claim 1, further comprising adapting the print information in the print data into different visual format and/or adapting the content of the print information.

3. The method according to claim 1, wherein the one or more predetermined rules in the database correspond to regulations for the print information to be in a specific print information format.

4. The method according to claim 3, wherein the regulations for the print information is related to one or more specific date formats, specific font sizes and/or type formats, specific number formats, specific dimension formats, specific barcode rules, or specific white space rules.

5. The method according to claim 1, wherein both design and printing of the print job is carried out in an external software module.

6. An industrial printer for printing print information on at least one information carrier, the industrial printer is configured to
   receive print data comprising the print information in a first print information format corresponding to a first country or market, the information carrier comprising the item to be printed on;
   receive print instructions relating the print data to at least one property associated with the at least one information carrier,
   adapt the print information in the print data into a second print information format corresponding to a second country or market according to one or more predetermined rules in a database corresponding to the related at least one property associated with the at least one information carrier, the at least one property being the second country or market for which the information carrier is designated, the one or more predetermined rules providing different information formatting for the first country or market and for the second country or market, wherein an adapting module is configured to adapt a first print area of the first print information format into a second print area to fit the second print information format, and printing the adapted print information in the second print data format on the at least one information carrier according to the second print area.

7. The industrial printer of claim 6, further configure to adapt the print information in the print data into different visual format and/or adapting the content of the print information.

8. The industrial printer according to claim 6, wherein the one or more predetermined rules in the database correspond to regulations for the print information to be in a specific print information format.

9. The industrial printer of claim 8, wherein the regulations for the print information is related to one or more specific date formats, specific font sizes and/or type formats, specific number formats, dimension formats, specific barcode rules, or specific white space rules.

10. One or more non-transitory computer readable media storing computer-executable instructions for printing print information on at least one information carrier which, when executed by at least one processor of an industrial printer, causes the at least one processor to perform operations comprising:

receiving print data comprising the print information in a first print information format corresponding to a first country or market, the information carrier comprising the item to be printed on;

receiving print instructions relating the print data to at least one property associated with the at least one information carrier;

adapting the print information in the print data into a second print information format corresponding to a second country or market according to one or more predetermined rules in a database corresponding to the related at least one property associated with the at least one information carrier, the at least one property being the second country or market for which the information carrier is designated, the one or more predetermined rules providing different information formatting for the first country or market and for the second country or market; and adapting a first print area of the first print information format into a second print area to fit the second print information format, and printing the adapted print information in the second print data format on the at least one information carrier according to the second print area.

* * * * *